UNITED STATES PATENT OFFICE.

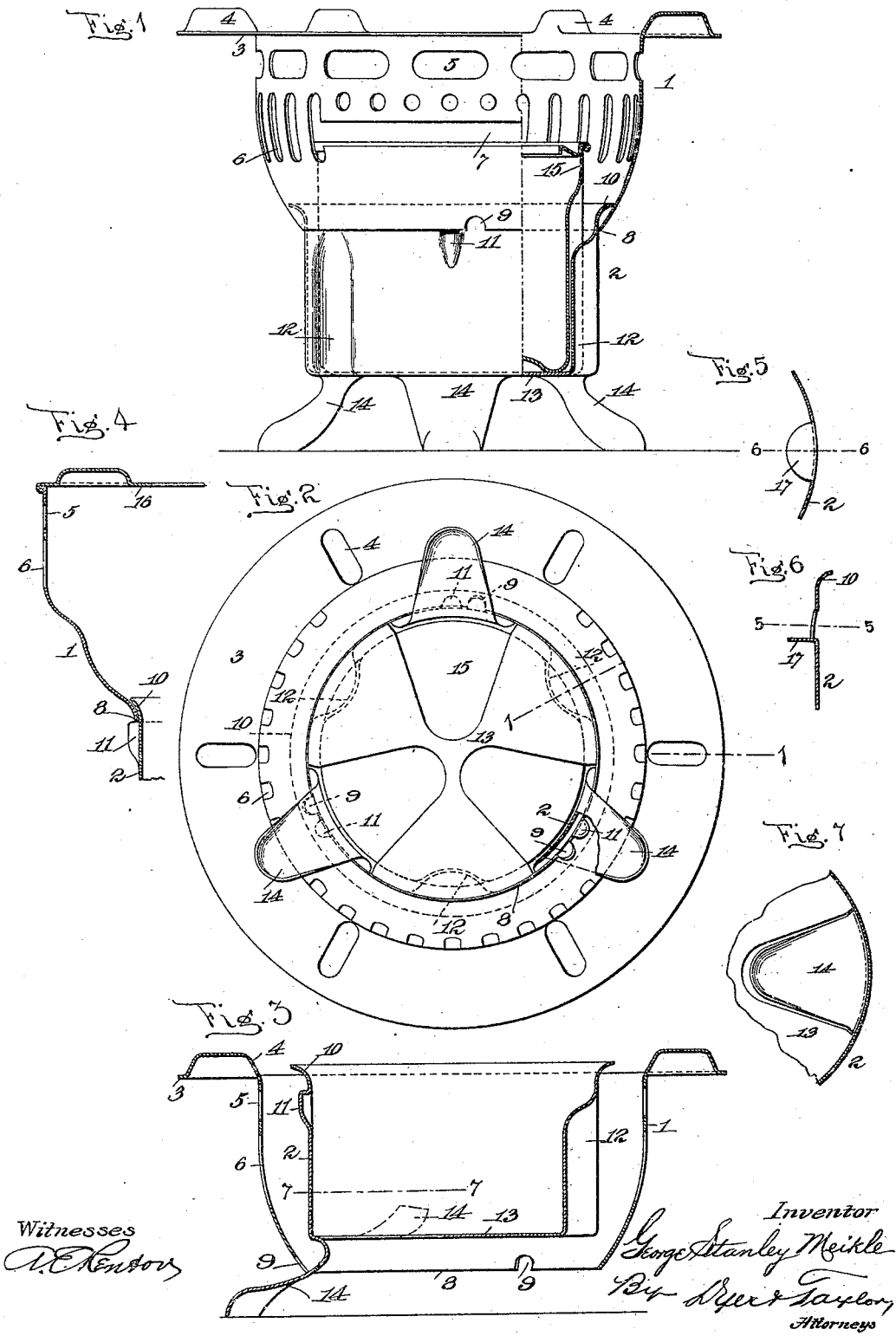

GEORGE STANLEY MEIKLE, OF NEW YORK, N. Y., ASSIGNOR TO S. STERNAU & COMPANY, INC., OF BROOKLYN, NEW YORK, A CORPORATION OF NEW YORK.

STAND FOR ALCOHOL BURNERS.

1,421,284.  Specification of Letters Patent.  Patented June 27, 1922.

Application filed September 25, 1919. Serial No. 326,183.

*To all whom it may concern:*

Be it known that I, GEORGE S. MEIKLE, a citizen of the United States, and a resident of the borough of Manhattan, city, county, and State of New York, have invented a certain new and useful Stand for Alcohol Burners, of which the following is a specification.

My invention relates to a device for supporting a culinary utensil and also a receptacle containing fuel, and more particularly to a stand for burning a solidified alcohol fuel which is burned in the same receptacle in which it is marketed.

The objects of the invention are to provide a stand for the purpose described, which will be strong and rigid in construction, which will be properly ventilated, which will be collapsible whereby economy of space in shipping and storing will be secured, and which, when extended, will form a stable support for the culinary utensil and the fuel container.

These and further objects will more fully appear in the following specification and accompanying drawings considered together or separately.

I have illustrated one embodiment of my invention in the accompanying drawing in which like parts in all of the several figures are designated by similar characters of reference, and in which—

Fig. 1 is a side elevation partly in section of my improved device in extended position, with a fuel container supported therein, the section being taken on the line indicated by 1—1 in Fig. 2.

Fig. 2 is a bottom plan view of the same with parts broken away.

Fig. 3 is a sectional view showing the stand in collapsed position.

Fig. 4 is a detail sectional view of a modification.

Figs. 5 and 6 are detail sectional views of a further modification, the views being taken at right angles to each other, and Fig. 7 is a detail section of the base at one step in the manufacture, the section being taken on the line 7—7 of Fig. 3.

In carrying out my invention I provide a stand comprising two members, a crown 1 and a base 2, each consisting preferably of thin sheet metal stamped or pressed to shape.

In the embodiment of the invention illustrated the crown is shown in the shape of a hollow spherical zone having its smaller diameter at the bottom. The upper edge of the member 1 is provided with a flange 3 having stamped up protuberances 4 whereby when a culinary utensil is supported on the stand it, the utensil, will rest upon the portions 4 and be raised above the flange.

Below the flange 3 the walls of the member 1 are provided with a series of horizontal slots 5 and a series of vertical slots 6. At one side of the member the slots 6 are interrupted and a long horizontal slot 7 is formed in the wall. The lower edge 8 of the member 1 is provided with a series of regularly disposed notches 9.

The base member 2 is composed of a body of general cylindrical shape, and having an outward flared portion 10 at its upper open end. The body of the member 2 is of such a diameter as to pass freely through the open, lower end of the member 1. The flared portion 10 of the body is of greater diameter than the open lower end of the member 1 and will act to prevent the base member, as a whole, from passing through said openings. The flared upper end of the base member is of considerably smaller diameter than that of the upper end of the crown member whereby the base member may be inserted in the crown member.

The base member is provided with a plurality of outwardly projecting lugs 11 which correspond in number and position to the notches 9 of the crown member. The lugs 11 are of such size as to pass freely through the notches when the base 2 is moved longitudinally through the lower open extremity of the crown member 1.

The body of the base member is preferably provided with a plurality, preferably three, flutes or grooves 12 longitudinally arranged and equally spaced in its cylindrical surface. The flutes 12 are open at the bottom and extend part way toward the top of the body.

Before, during or after the forming of the body 2 to cylindrical shape, the bottom 13 thereof may be slitted to form a plurality of more or less triangular tongues 14 attached to the body at or near the cylindrical wall thereof, and preferably pressed into more or less cup-shape to form feet for supporting the device. The latter operation may be conveniently carried out during the operation of forming the base to the desired shape.

The base 2 with the tongues 14 cupped as above described, and with the said tongues lying within the recesses from which they were cut, as shown in Fig. 7, is placed within the crown member 1 as shown in Fig. 3. The parts will be thus nested and will occupy a minimum space.

When the device is to be assembled, the base member is positioned within the crown member with the lower end of the base member projecting through the lower end of the crown member. Each of the tongues 14 is now bent outwardly from above to the positions shown in Figs. 1, 2 and 3. The projecting tongues will thus be formed into feet whereby the device as a whole may be supported on a plane surface such as a table. If desired various articles, such for example, as the handles of cooking utensils, a can of fuel, or the like may be placed within the base member 2 to further economize space.

When the device is to be used, the base member is moved downward until the lugs 11 engage the lower restricted end of the crown member. The base is then rotated until the lugs are in alignment with the notches 9. The base is then lowered until further movement is arrested by the engagement of its flared upper portion 10 with the inside of the member 1 above the lower open end thereof. The lugs will now be below and outside of the member 1. The member 2 is now rotated relatively to the crown to remove the lugs from coincidence with the notches, thus securely locking the base to the crown by the engagement of the flared upper end of the base and the lugs with the inside and outside respectively of the crown.

A can 15 of fuel may now be placed within the base 2 and resting on the bottom thereof. If a can having longitudinal flutes in its cylindrical wall be used the flutes 12 of the base will engage the flutes of the can and retain the latter against rotation. The openings from which the tongues 14 are bent, and the slots 5 and 6 will permit of sufficient air to support combustion.

The parts are so proportioned that the top of the can 15 will be at such a distance below the bottom of a cooking utensil resting on the flange 3, as to give the best results. When it is desired to extinguish the flame a flat extinguisher (not shown) is passed through the slot 7 and placed over the open end of the can. This will extinguish the flame and, when the parts have cooled sufficiently a tight cover may be placed within the flame opening of the can to prevent evaporation of the fuel.

In the modification illustrated in Fig. 4, I have shown an annulus 16 secured to the top of the crown 1, instead of the integral flange 3. The annulus may be secured in position by having its outer peripheral edge rolled over the edge of the crown, or in any other preferred manner.

Instead of forming flutes 12 in the side wall of the base member, semicircular slits may be cut in the said wall, and fingers 17 formed thereby may be bent inward to engage the flutes in the can.

The flared portion 10 of the base member may be normally of slightly greater diameter than that portion of the crown member with which it engages whereby, when the parts are in locked engagement, the upper edge of the base will be slightly compressed, or the lower edge of the crown will be slightly expanded as the case may be, and a relatively tight joint between the members will be produced.

When the device is not in use the base member may be rotated relatively to the crown until the lugs 11 are in coincidence with the notches 9 when the base member 2 may be moved into the crown member, as shown in Fig. 3, and, if desired the legs may be pressed back into the spaces from which they were bent and a more compact package will result.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described my invention what I claim as new and desire to secure by Letters Patent is:—

1. A device of the character described, comprising a hollow crown member having converging walls, there being an axial opening in the member, there being a plurality of notches in the lower edge of the member each communicating with the opening, a hollow base member adapted to be positioned within the opening and movable therein, said base member having a flaring, flexible upper edge whereby movement of the base through the opening in one direction will be limited by the engagement of the flared edge with the interior of the converging walls of the crown member, a plurality of outwardly projecting lugs on the base portion, said lugs being so proportioned as to pass through the notches in the crown whereby the crown may be rotated and locked to the base between the said lugs and the converging walls.

2. A device of the character described, comprising a bowl shaped crown member, there being an axial opening in the member, there being a lateral opening in the crown below the top thereof, there being a plurality of notches in the member each communicating with the axial opening, a base member adapted to be positioned within the axial opening and movable therein, said base member having a flaring upper end, said end being of greater diameter than the said axial opening whereby movement of the base through the opening in one direction will be limited, a plurality of outwardly projecting lugs on the base portion, said lugs being so proportioned as to pass through the notches in the crown, and means whereby the crown may be locked to the base between the said lugs and flared portion, said base member being adapted to support a cylindrical fuel receptacle, the top of the receptacle being on approximately the plane of the lateral opening in the crown member, the length of said lateral opening being approximately the same as the diameter of the receptacle.

3. A device of the character described, comprising a bowl-shaped crown member, there being a circular opening in the bottom of the member, a hollow cylindrical base member loosely fitting within the opening and in axial alinement with the crown member, said base member having a flaring upper edge adapted to engage the convex surface of the crown member near the opening and preventing movement of the base through the opening in one direction, said base member having a bottom adapted to support a fuel receptacle, a plurality of tongues carried by the base and lying within the boundaries of the bottom thereof, whereby said base may be passed through the opening in the crown by movement in one direction, said tongues being so constructed and arranged that they may be bent radially outward when the base is in position in the opening to prevent removal of the base from the opening, said tongues when bent outward forming feet to support the base and through the base the crown.

4. A device of the character described, comprising a bowl-shaped crown member, there being an opening in the bottom of said member, a hollow base member of general cylindrical shape and having a bottom, said base member lying within the said bottom opening and movable relatively to the crown member, the upper end of the base member being flared outwardly, the curvature of said flared end being opposed to that of the inner surface of the crown member, legs struck from the bottom of the base member and extending outwardly beyond the periphery of the cylinder, said flaring portion and legs preventing separation of the members, and means for locking the members together with the flared end of the base in engagement with the concave surface of the crown member in proximity to the bottom opening therein.

This specification signed and witnessed this 22nd day of September, 1919.

GEORGE STANLEY MEIKLE.

Witnesses:
 JAMES F. COLEMAN,
 A. E. RENTON.